(12) United States Patent
Tanaka et al.

(10) Patent No.: US 10,685,179 B2
(45) Date of Patent: Jun. 16, 2020

(54) XML VERIFICATION APPARATUS, VERIFICATION METHOD, ENCODING APPARATUS, ENCODING METHOD, AND COMPUTER-READABLE RECORDING MEDIUM

(71) Applicant: FUJITSU LIMITED, Kawasaki-shi, Kanagawa (JP)

(72) Inventors: Hideaki Tanaka, Kawasaki (JP); Masahiro Kataoka, Kamakura (JP); Takehiro Ide, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/725,416

(22) Filed: Oct. 5, 2017

(65) Prior Publication Data

US 2018/0101519 A1    Apr. 12, 2018

(30) Foreign Application Priority Data

Oct. 12, 2016 (JP) .................................. 2016-201325

(51) Int. Cl.
| | |
|---|---|
| *G06F 17/20* | (2006.01) |
| *G06F 40/226* | (2020.01) |
| *G06F 40/14* | (2020.01) |
| *G06F 40/117* | (2020.01) |
| *G06F 40/284* | (2020.01) |

(52) U.S. Cl.
CPC .......... *G06F 40/226* (2020.01); *G06F 40/117* (2020.01); *G06F 40/14* (2020.01); *G06F 40/284* (2020.01)

(58) Field of Classification Search
CPC combination set(s) only.
See application file for complete search history.

(56) References Cited

U.S. PATENT DOCUMENTS

| | | | |
|---|---|---|---|
| 7,043,686 B1 | 5/2006 | Maruyama et al. | |
| 7,146,422 B1 * | 12/2006 | Marlatt | G06F 40/226 709/227 |

(Continued)

FOREIGN PATENT DOCUMENTS

| | | |
|---|---|---|
| JP | 2001-217720 A | 8/2001 |
| JP | 2003-084987 | 3/2003 |

(Continued)

OTHER PUBLICATIONS

Sakr, Sherif, "Investigate state-of-the-art XML compression techniques" (Jul. 2011) (Year: 2011).*

(Continued)

*Primary Examiner* — Shahid K Khan
(74) *Attorney, Agent, or Firm* — Xsensus LLP

(57) ABSTRACT

A verification method includes: receiving encoded data that is encoded by an encoding dictionary in which a tag name and a definition value of each of a plurality of tags are associated with a code corresponding to the tag name and the definition value of each of the plurality of tags, by a processor; and when decoding the encoded data, when decoding a code associated with a processing function from among codes registered in the encoding dictionary, performing verification processing of decoded data, which has been decoded, by using the processing function, by the processor.

6 Claims, 12 Drawing Sheets

(56) References Cited

U.S. PATENT DOCUMENTS

| | | | |
|---|---|---|---|
| 2003/0154444 A1* | 8/2003 | Tozawa | G06F 40/14 |
| | | | 715/234 |
| 2004/0013307 A1* | 1/2004 | Thienot | H04N 21/2353 |
| | | | 382/232 |
| 2004/0268239 A1 | 12/2004 | Fujita | |
| 2006/0059187 A1* | 3/2006 | Brown | H03M 7/30 |
| 2008/0313234 A1* | 12/2008 | Chen | G06F 40/226 |
| 2009/0193045 A1 | 7/2009 | Werner | |
| 2010/0211867 A1* | 8/2010 | Heuer | G06F 17/2247 |
| | | | 715/234 |

FOREIGN PATENT DOCUMENTS

| | | |
|---|---|---|
| JP | 2004-302799 A | 10/2004 |
| JP | 2013-101565 | 5/2013 |
| JP | 2014-238863 | 12/2014 |

OTHER PUBLICATIONS

Sakr, Sherif, "Investigate state-of-the-art XML compression techniques" (Available at https://www.ibm.com/developerworks/library/x-datacompression/index.html) (Year: 2011).*

Japanese Office Action dated Mar. 31, 2020 in Japanese patent application No. 2016-201325.

\* cited by examiner

| CLASSIFICA-TION | NUMBER OF BYTES | ENCODING RANGE | DETAILED CLASSIFICATION | SPECIFIC EXAMPLE OF XML DATA |
|---|---|---|---|---|
| HIGH FREQUENCY KEYWORD | 1 | 00h TO 7Fh | START TAG END TAG | <Sequence>, <Endpoint> </Sequence>, </Endpoint> |
| LOW FREQUENCY KEYWORD | 2 | 8000h TO 8FFFh | SELECTION TYPE DEFINITION VALUE OMISSION OF DEFINITION VALUE | SyncServiceCall (OMISSION) |
| USER-DEFINED VALUE | 2 3 | 9000h TO EFFFh F00000h TO FFFFFFh | ARBITRARILY INPUTTED DEFINITION VALUE | calctest soap_sync |

FIG.6

```
<?xml version="1.0" encoding="UTF-8" ?>
<Sequence>
    <SequenceName>calctest</SequenceName>
    <Mediator>
        <FunctionName>SyncServiceCall</FunctionName>
        <ParameterList>    c1
t1       <Endpoint>soap_sync</Endpoint>       t2
t3       <RetryCount>5</RetryCount>           t4
        </ParameterList>  c2
        <Return>endpoint.outbound</Return>
    </Mediator>
</Sequence>
```

XML VERIFICATION APPARATUS, VERIFICATION METHOD, ENCODING APPARATUS, ENCODING METHOD, AND COMPUTER-READABLE RECORDING MEDIUM

CROSS-REFERENCE TO RELATED APPLICATION

This application is based upon and claims the benefit of priority of the prior Japanese Patent Application No. 2016-201325, filed on Oct. 12, 2016, the entire contents of which are incorporated herein by reference.

FIELD

The embodiment discussed herein is related to a verification apparatus and the like.

BACKGROUND

Regarding an extensible markup language (XML) document, every time the document is transmitted and received, a verification using a schema and a verification related to a check item corresponding to each tag in the document are performed.

Verification of XML document is performed as described below. For example, in the verification processing, compressed data of an XML file that is ZIP-compressed to reduce the file size is expanded and a verification using a lexical analysis and a schema is performed on the expanded document data. In the verification processing, after tags in the entire document have been discriminated by the lexical analysis, verification corresponding to each tag in the document is performed.

[Patent Document 1] Japanese Laid-open Patent Publication No. 2003-84987

[Patent Document 2] Japanese Laid-open Patent Publication No. 2013-101565

[Patent Document 3] Japanese Laid-open Patent Publication No. 2014-238863

SUMMARY

According to an aspect of the embodiments, a verification method includes: receiving encoded data that is encoded by an encoding dictionary in which a tag name and a definition value of each of a plurality of tags are associated with a code corresponding to the tag name and the definition value of each of the plurality of tags, by a processor; and when decoding the encoded data, when decoding a code associated with a processing function from among codes registered in the encoding dictionary, performing verification processing of decoded data, which has been decoded, by using the processing function, by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram for explaining a compression dictionary according to the embodiment;

FIG. 6 is a diagram illustrating an example of XML data;

DESCRIPTION OF EMBODIMENTS

However, the related art has a problem that it takes time to verify an XML document when the XML document is compressed. For example, in the related art, compressed data of the XML file is expanded, the expanded document data is lexically analyzed, and thereafter, a verification corresponding to each tag in the document data is performed, so that the verification takes time.

Figure 1:
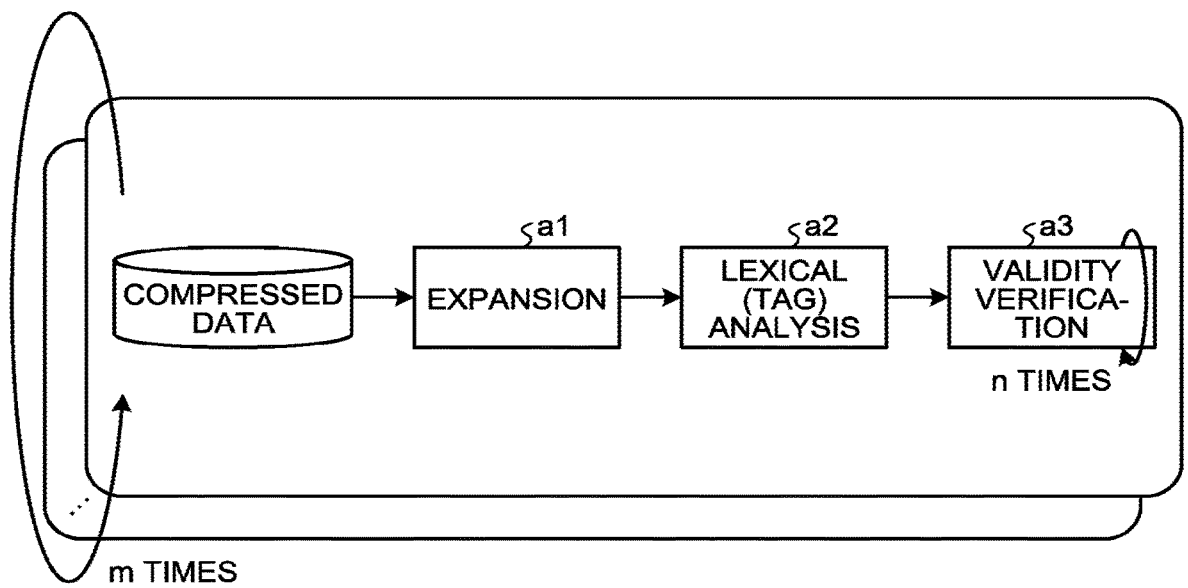
FIG. 1 is a diagram illustrating an example of verification processing of an XML document.

Here, the problem that it takes time to verify an XML document when the XML document is compressed will be described with reference to FIG. 1. FIG. 1 is a diagram illustrating an example of verification processing of an XML document. As illustrated in FIG. 1, when the XML document is compressed, the verification processing expands compressed data (a1) and performs lexical (tag) analysis on the expanded document data (a2). The verification processing performs validity verification corresponding to each tag in the document data after discrimination of tags is completed by the lexical (tag) analysis (a3). When the number of types of tags on which the validity verification is performed is n, the validity verification is performed by scanning the document data n times from the head of the document data. Further, when there are m XML documents, in the validity verification, verification processing from expansion to validity verification is performed for each XML document, so that the verification processing is performed m times. As a result, regarding the verification processing, it takes time to perform the validity verification on an XML document when the XML document is compressed.

Preferred embodiments will be explained with reference to accompanying drawings. The present invention is not limited by the embodiment.

Example of Flow of Verification Processing According to Embodiment

Figure 2:
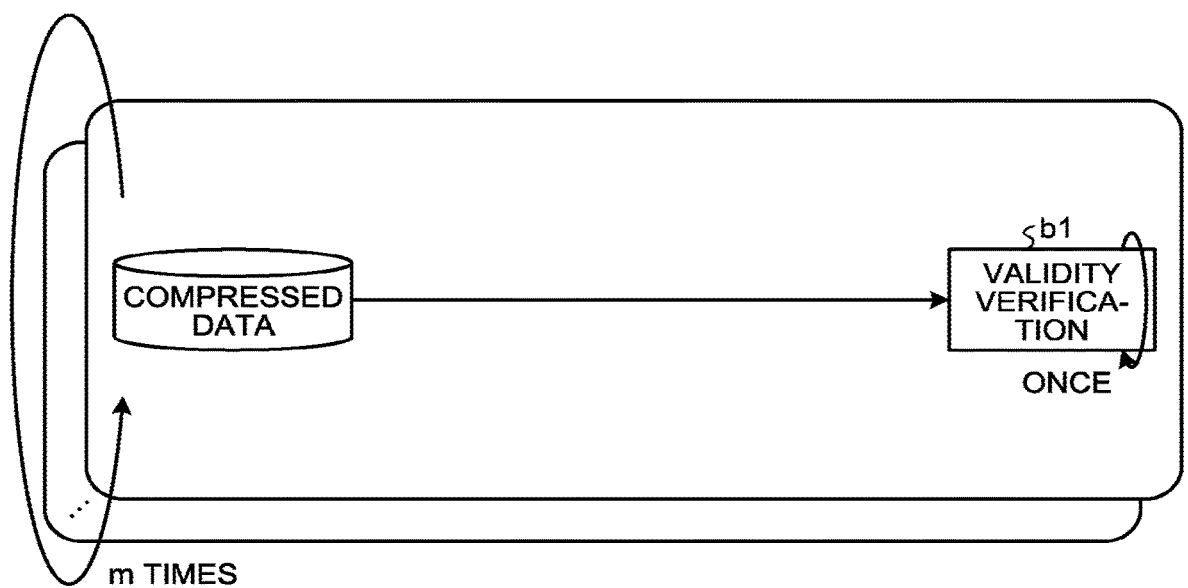
FIG. 2 is a diagram illustrating an example of verification processing of an XML document according to an embodiment.

FIG. 2 is a diagram illustrating an example of verification processing of an XML document according to the embodiment.

As illustrated in FIG. 2, when the verification processing receives compressed data of an XML document which is compressed by a compression dictionary in which a tag name and a definition value of each of a plurality of tags are associated with a code corresponding to the tag name and the definition value of each of the plurality of tags, the verification processing performs the following processing. When decoding the compressed data, the verification processing verifies validity of the XML document of decoded data, which has been decoded, by a validity check function associated with each of elements (codes) of an automaton generated corresponding to the compression dictionary (b1). When there are n types of tags on which validity verification is performed in the XML document, the verification processing completes the validity verification by scanning the compressed data from the head of the compressed data only once. Further, when there are m compressed data, the verification processing is performed for each compressed data, so that the verification processing is performed m times. The "compressed" may be replaced by "encoded".

Thereby, the verification processing can collectively perform tag decoding, data recognition, and data validity verification. As a result, the verification processing can shorten verification time as compared with a case where the validity of XML document is verified after decoding compressed data and performing lexical analysis.

The XML document is a document in which tags and contents (definition values) of the tags are mixed. The tag indicates a character string which begins with a start symbol '<' and ends with an end symbol '>'. The tag includes a start tag and an end tag. For example, the XML document is "<RetryCount>5</RetryCount>". In this data, <RetryCount> is the start tag and </RetryCount> is the end tag. In this data, "5" corresponds to a character string of content (definition value) of the tag.

Configuration of Information Processing Apparatus According to Embodiment

Figure 3:
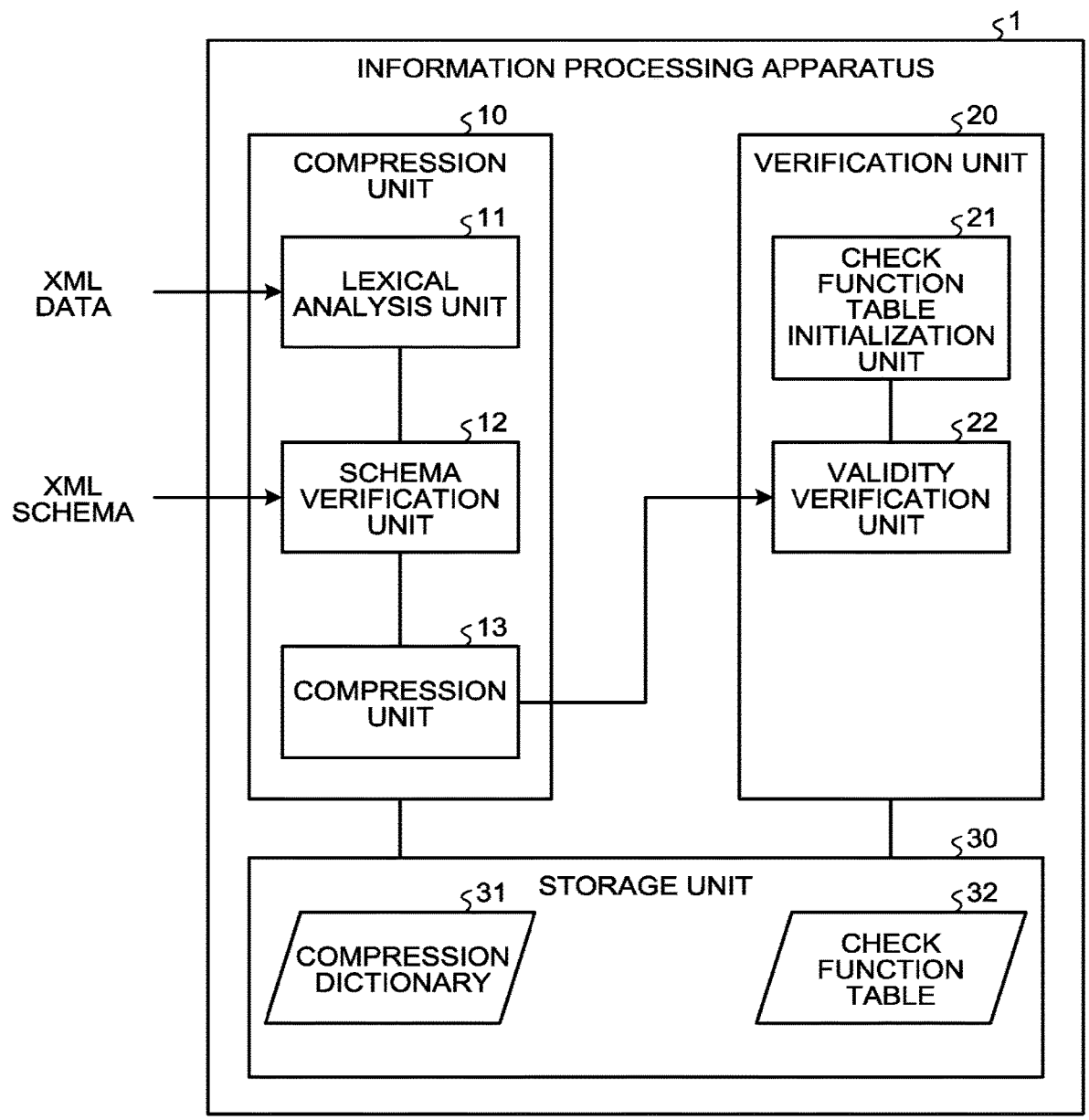
FIG. 3 is a functional block diagram illustrating a configuration of an information processing apparatus according to the embodiment.

FIG. 3 is a functional block diagram illustrating a configuration of an information processing apparatus according to the embodiment. As illustrated in FIG. 3, the information processing apparatus 1 has a compression unit 10, a verification unit 20, and a storage unit 30.

A storage unit 30 corresponds to a storage apparatus such as a non-volatile semiconductor memory element such as, for example, a flash memory and an FRAM (registered trademark) (Ferroelectric Random Access Memory). The storage unit 30 has a compression dictionary 31 and a check function table 32.

The compression dictionary 31 is a dictionary used when compressing an XML document. The compression dictionary 31 is a dictionary where appearance frequencies of keywords and definition values that appear in an XML document are specified, and the higher the appearance frequency of a keyword or a definition value, the shorter a code assigned to the keyword or the definition value, based on an ordinary XML document or the like. The keyword mentioned here is a tag name of a tag. The definition value mentioned here is content of the tag.

Here, the compression dictionary 31 will be described with reference to FIG. 4. FIG. 4 is a diagram for explaining the compression dictionary according to the embodiment. FIG. 4 illustrates the number of bytes, an encoding range, a detailed classification, and a specific example of XML data for each classification as an example of the compression dictionary 31.

In the classification, a high frequency keyword, a low frequency keyword, and a user-defined value are represented. The high frequency keyword defined as one classification is a keyword whose appearance frequency is high, and an example of the high frequency keyword is a start tag and an end tag represented in the detailed classification. The low frequency keyword defined as one classification is a keyword whose appearance frequency is low, and an example of the low frequency keyword is a selection type definition value and an omission of definition value represented in the detailed classification. The user-defined value defined as one classification is a keyword whose appearance frequency is low, and an example of the user-defined value is an arbitrarily inputted definition value represented in the detailed classification.

The number of bytes is the number of bytes of an encoded code which is a compressed code. The number of bytes corresponding to the high frequency keyword is "1". The number of bytes corresponding to the low frequency keyword is "2". The number of bytes corresponding to the user-defined value is "2" or "3".

The encoding range is an encodable range. The encoding range corresponding to the high frequency keyword is "00h-7Fh". The encoding range corresponding to the low frequency keyword is "8000h-8FFFh". The encoding range corresponding to the user-defined value is "9000h-EFFFh" when the number of bytes is "2", and is "F00000h-FFFFFFh" when the number of bytes is "3".

In the specific example of XML data, a specific example of keyword or definition value for each classification is represented. Specific examples of XML data corresponding to the high frequency keyword include <Sequence>, </Sequence>, <Endpoint>, </Endpoint>, and the like. Specific examples of XML data corresponding to the low frequency keyword include "SyncServiceCall", omission, and the like. Specific examples of XML data corresponding to the user-defined value include "calctest", "soap_sync", and the like. In the high frequency keyword and the low frequency keyword, an encoded code within each encoding range is assigned to the keyword and registered in advance. In the user-defined value, an encoded code within the encoding range is not assigned to the defined value in advance. If the definition value appears during compression, an encoded code is assigned and registered.

As an example, "<Sequence>" is assigned to "01h", and "</Sequence>" is assigned to "02h". Further, "<Endpoint>" is assigned to "3Bh", and "</Endpoint>" is assigned to "7Bh". Further, "<SyncServiceCall>" is assigned to "8100h".

Let us return to FIG. 3. The check function table 32 is a table where a code is associated with a validity check function.

Figure 5:
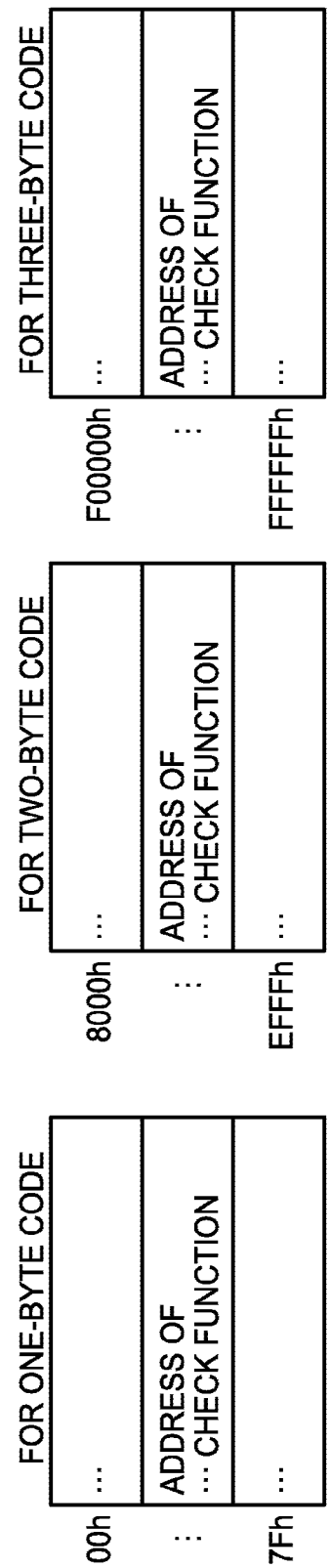
FIG. 5 is a diagram illustrating an example of a data structure of a check function table according to the embodiment.

Here, an example of a data structure of the check function table 32 will be described with reference to FIG. 5. FIG. 5 is a diagram illustrating an example of a data structure of the check function table according to the embodiment. As illustrated in FIG. 5, the check function table 32 includes a one-byte code table, a two-byte code table, and a three-byte code table. In the one-byte code table, an encoded code of one byte is associated with an address of a validity check function. In the two-byte code table, an encoded code of two bytes is associated with an address of a validity check function. In the three-byte code table, an encoded code of three bytes is associated with an address of a validity check function. When there is no address to be associated with the encoded code, "0" is set as the address of the check function. This case means that it is not necessary to check (verify) validity of a character string corresponding to the encoded code. The check function table 32 is generated corresponding to the compression dictionary 31, so that the same encoded codes in the check function table 32 and the compression dictionary 31 have the same meaning.

Let us return to FIG. 3. The compression unit 10 has a lexical analysis unit 11, a schema verification unit 12, and a compression unit 13. The verification unit 20 has a check function table initialization unit 21 and a validity verification unit 22. The compression unit 13 is an example of an encoding unit. The check function table initialization unit 21 is an example of a generation unit. The validity verification unit 22 is an example of a reception unit and a verification unit.

The lexical analysis unit 11 lexically analyzes XML data to be compressed. For example, the lexical analysis unit 11 performs lexical analysis by using the start symbol '<' and the end symbol '>' as delimiting characters. As an example, when the lexical analysis unit 11 detects the start symbol '<' in the XML data to be compressed, the lexical analysis unit 11 extracts a character string from the start symbol '<' to the end symbol '>'. Further, when the lexical analysis unit 11 detects the end symbol '>' in the XML data to be compressed, the lexical analysis unit 11 extracts a character string from the end symbol '>' to the start symbol '<'. The lexical analysis unit 11 stores the extracted character string in XML analysis content as an analysis result. The lexical analysis unit 11 performs the lexical analysis until the end of the XML data.

The schema verification unit 12 verifies validity of an XML document by using an XML schema for the XML analysis content indicating a result of the lexical analysis of the XML data. The XML schema here is a file where a logical structure of the XML document is defined. For example, the schema verification unit 12 determines whether or not all the analysis results of the XML analysis content are valid by using the XML schema. When all the analysis results are valid, the schema verification unit 12 outputs the XML analysis content to the compression unit 13. When all the analysis results are not valid, the schema verification unit 12 outputs information indicating that the verification of the schema is not valid.

The compression unit 13 compresses XML data by using the compression dictionary 31. For example, the compression unit 13 performs the following processing on the character strings of all the analysis results of the XML analysis content. The compression unit 13 refers to the XML analysis content and determines whether or not a character string of the analysis result is a tag. Whether or not the character string is a tag may be determined by whether or not a start character is '<'. When the character string of the analysis result is a tag, the compression unit 13 acquires an encoded code corresponding to the tag from the compression dictionary 31. The tag here corresponds to, for example, a high frequency keyword. Then, the compression unit 13 adds the acquired encoded code to the compressed data. When the character string of the analysis result is not a tag, the compression unit 13 determines whether or not the character string of the analysis result is included in the compression dictionary 31. When the character string of the analysis result is included in the compression dictionary 31, the compression unit 13 acquires an encoded code corresponding to the character string from the compression dictionary 31. The character string which is not a tag but is included in the compression dictionary 31 corresponds to, for example, a low frequency keyword. Then, the compression unit 13 adds the acquired encoded code to the compressed data. When the character string of the analysis result is not included in the compression dictionary 31, the compression unit 13 assigns the character string of the analysis result to an encoded code in the compression dictionary 31 and registers the character string of the analysis result in the compression dictionary 31 in association with the assigned encoded code. The character string that is not included in the compression dictionary 31 corresponds to, for example, a user-defined value. Then, the compression unit 13 adds the assigned encoded code to the compressed data.

The check function table initialization unit 21 initializes the check function table 32 corresponding to the compression dictionary 31. For example, the check function table initialization unit 21 registers an address of each check function by associating an encoded code of each of the high frequency keywords in the compression dictionary 31 with the same encoded code for one-byte code. The check function table initialization unit 21 registers an address of each check function by associating an encoded code of each of the low frequency keywords and the user-defined values in the compression dictionary 31 with the same encoded code for two-byte code. The check function table initialization unit 21 registers an address of each check function by associating an encoded code of each of the user-defined values in the compression dictionary 31 with the same encoded code for three-byte code.

When decoding the compressed data, the validity verification unit 22 verifies validity of decoded data, which has been decoded, by a check function associated with each of the encoded codes in the check function table 32. For example, the validity verification unit 22 performs the following processing on all the encoded codes from the first encoded code to the last encoded code of the compressed data. The validity verification unit 22 acquired a first byte of an encoded code from the compressed data. The validity verification unit 22 determines how many bytes the encoded code has by using the acquired first byte. When the encoded code is a one-byte code, the validity verification unit 22 refers to the check function table 32 for one-byte code and acquires an address of a check function corresponding to the encoded code. When the encoded code is a two-byte code, the validity verification unit 22 refers to the check function table 32 for two-byte code and acquires an address of a check function corresponding to the encoded code. When the encoded code is a three-byte code, the validity verification unit 22 refers to the check function table 32 for three-byte code and acquires an address of a check function corresponding to the encoded code. When the encoded code is a code corresponding to a start tag, the validity verification unit 22 stores the address of the check function corresponding to the encoded code from the check function table 32 into a register. When the encoded code is a code corresponding to an end tag, the validity verification unit 22 does nothing. When the encoded code is not a code corresponding to a tag, the validity verification unit 22 acquires a character string corresponding to the encoded code from the compression dictionary 31. Then, the validity verification unit 22 performs the check function of the address stored in the register on the acquired character string. That is, the validity verification unit 22 performs a check function associated with a start tag on a character string following the start tag.

FIG. 6 is a diagram illustrating an example of XML data. As illustrated in FIG. 6, The XML data is represented by tags and contents (definition values) of the tags. As an example, <Endpoint> indicated by a code t1 is the start tag and </Endpoint> indicated by a code t2 is the end tag. A character string "soap_sync" indicated by a code c1 is the content (definition value) of the tag. The validity verification unit 22 checks, for example, that the content (definition value) is not omitted from the tag.

As another example, <RetryCount> indicated by a code t3 is the start tag and </RetryCount> indicated by a code t4 is the end tag. A character "5" indicated by a code c2 is the content (definition value) of the tag. The validity verification unit 22 checks, for example, that the content (definition value) of the tag is a value from 0 to 100.

Figure 7:
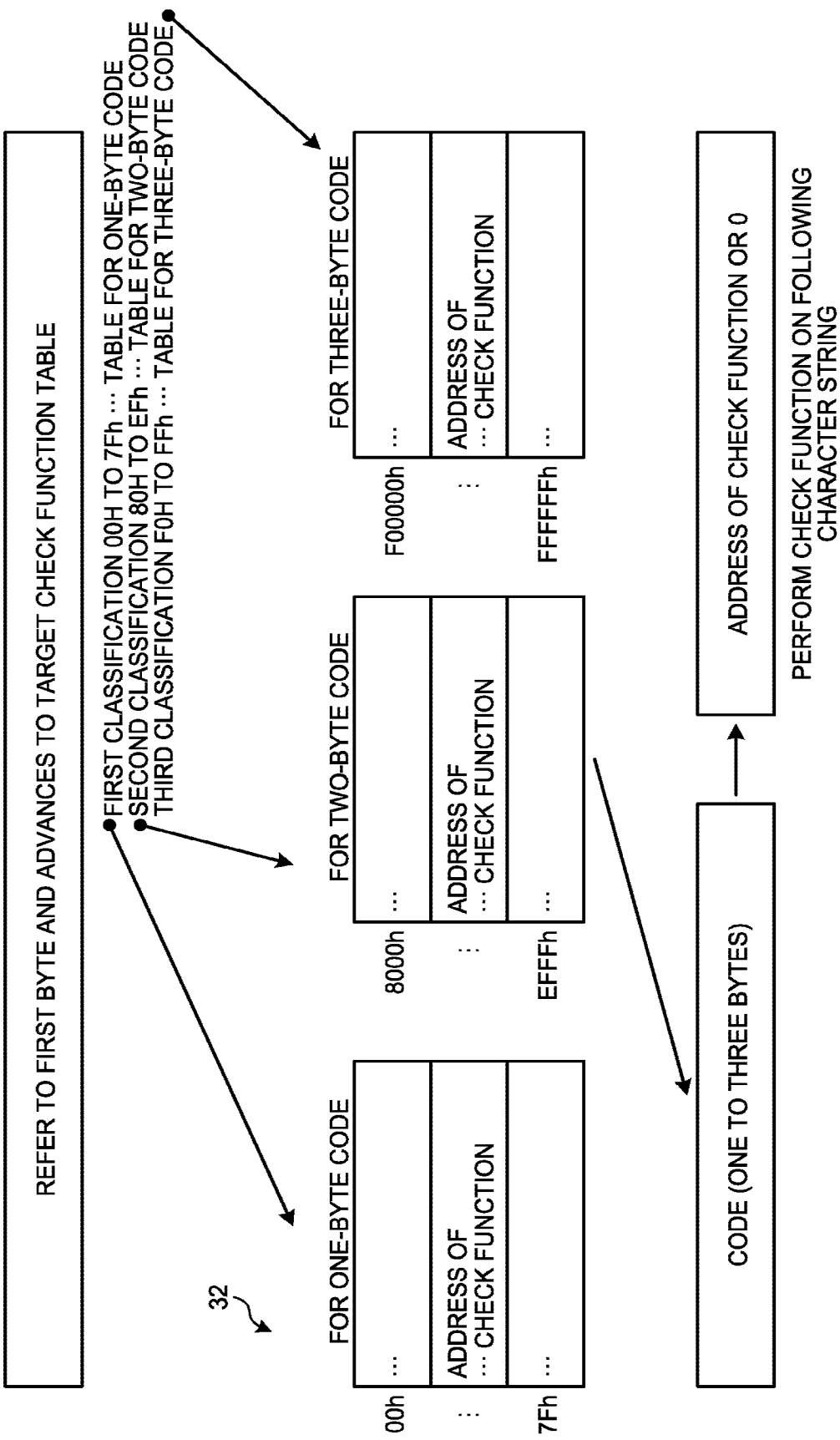
FIG. 7 is a diagram illustrating an example of a flow of validity verification processing according to the embodiment.

FIG. 7 is a diagram illustrating an example of a flow of validity verification processing according to the embodiment. As illustrated in FIG. 7, the validity verification unit 22 refers to a first byte of an encoded code of compressed data and advances to a target check function table 32. When the first byte is a first classification of 00h to 7Fh, the validity verification unit 22 advances to a table for one-byte code. When the first byte is a second classification of 80h to EFh, the validity verification unit 22 advances to a table for two-byte code. When the first byte is a third classification of F0h to FFh, the validity verification unit 22 advances to a table for three-byte code. The validity verification unit 22 refers to the target table and acquires an address of a check function corresponding to an encoded code or 0. When the validity verification unit 22 acquires the address of a check function corresponding to an encoded code, the validity verification unit 22 performs a check function on a character string obtained by decoding the following encoded code.

Figure 8:
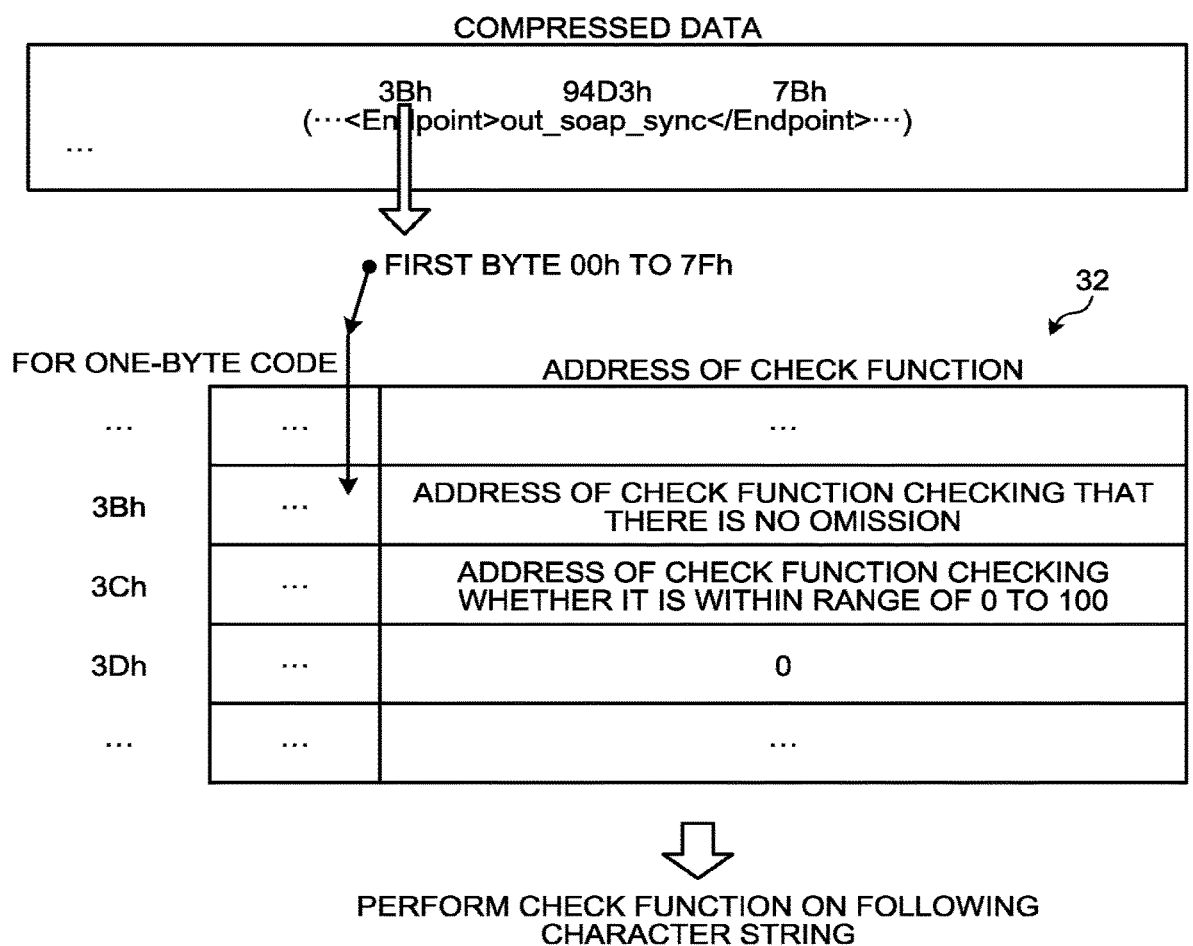
FIG. 8 is a diagram illustrating a specific example of the validity verification processing according to the embodiment.

FIG. 8 is a diagram illustrating a specific example of the validity verification processing according to the embodiment. In FIG. 8, it is assumed that the compressed data is " . . . 3Bh94D3h7bH . . . ". "3Bh" is an encoded code of the start tag "<Endpoint>". "94D3h" is an encoded code of the definition value "out_soap_sync". "7Bh" is an encoded code of the end tag "</Endpoint>".

As illustrated in FIG. 8, the validity verification unit 22 refers to a first byte of an encoded code of compressed data and advances to a target check function table 32. Here, the first byte of the encoded code is "3Bh". "3Bh" is included in 00h to 7Fh, so that the validity verification unit 22 determines that "3Bh" is for one-byte code and advances to the check function table 32 for one-byte code.

Then, the validity verification unit 22 refers to the check function table 32 for one-byte code and acquires an address of a check function corresponding to the encoded code or 0. Here, as an address of a check function corresponding to the encoded code "3Bh", "address of check function checking that there is no omission" is acquired.

When the encoded code is a code corresponding to a start tag, the validity verification unit 22 stores the acquired address of the check function into a register. Here, the encoded code "3Bh" is a start tag, so that "address of check function checking that there is no omission" acquired as the address of the check function is stored in the register.

Subsequently, the validity verification unit 22 refers to a first byte of the next encoded code and advances to a target check function table 32. Here, the first byte of the encoded code is "94h". "94h" is included in 8000h to EFFFh, so that the validity verification unit 22 determines that "94h" is for two-byte code and advances to the check function table 32 for two-byte code.

Then, the validity verification unit 22 refers to the check function table 32 for two-byte code and acquires an address of a check function corresponding to the encoded code or 0. Here, "0" is acquired as an address of a check function corresponding to the encoded code "94D3h".

When the encoded code is not a code corresponding to a tag, the validity verification unit 22 acquires a character string corresponding to the encoded code from the compression dictionary 31. Then, the validity verification unit 22 performs the check function of the address stored in the register on the character string. That is, the validity verification unit 22 performs the check function on a character string following the start tag. Here, the encoded code "94D3h" is not a code corresponding to a tag, so that the validity verification unit 22 acquires a character string "out_soap_sync" corresponding to the encoded code "94D3h" from the compression dictionary 31. Then, the validity verification unit 22 performs the check function of the address stored in the register on the character string. That is, the validity verification unit 22 performs a check function checking that there is no omission on the character string "out_soap_sync" following the start tag indicated by the encoded code "3Bh".

Flowchart of Lexical Analysis Processing

Figure 9:
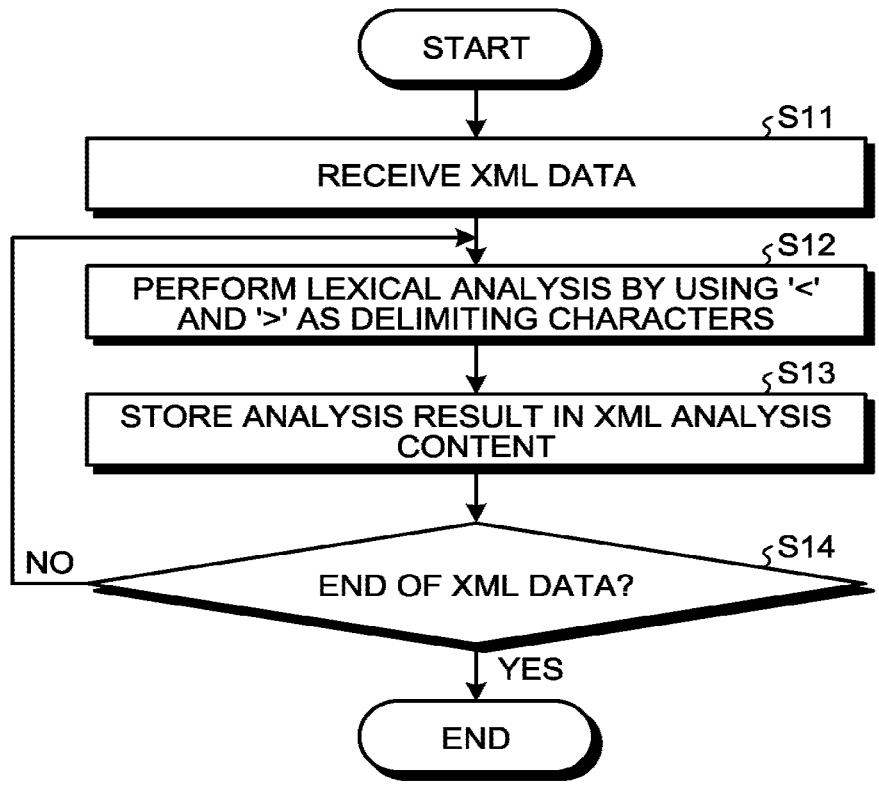
FIG. 9 is a diagram illustrating an example of a flowchart of lexical analysis processing according to the embodiment.

FIG. 9 is a diagram illustrating an example of a flowchart of lexical analysis processing according to the embodiment. As illustrated in FIG. 9, the lexical analysis unit 11 receives XML data (Step S11).

The lexical analysis unit 11 performs lexical analysis by using the start symbol '<' and the end symbol '>' as delimiting characters (Step S12). For example, when the lexical analysis unit 11 detects the start symbol '<' from the XML data, the lexical analysis unit 11 extracts a character string from the start symbol '<' to the end symbol '>' as an analysis result. When the lexical analysis unit 11 detects the end symbol '>' from the XML data, the lexical analysis unit 11 extracts a character string from the end symbol '>' to the start symbol '<' as an analysis result.

Then, the lexical analysis unit 11 stores the analysis result in the XML analysis content (Step S13).

Then, the lexical analysis unit 11 determines whether or not it is the end of the XML data (Step S14). When the lexical analysis unit 11 determines that it is not the end of the XML data (Step S14; No), the lexical analysis unit 11 proceeds to Step S12 to analyze the next character string. On the other hand, when the lexical analysis unit 11 determines that it is the end of the XML data (Step S14; Yes), the lexical analysis unit 11 ends the lexical analysis processing of the received XML data.

Flowchart of Schema Verification Processing

Figure 10:
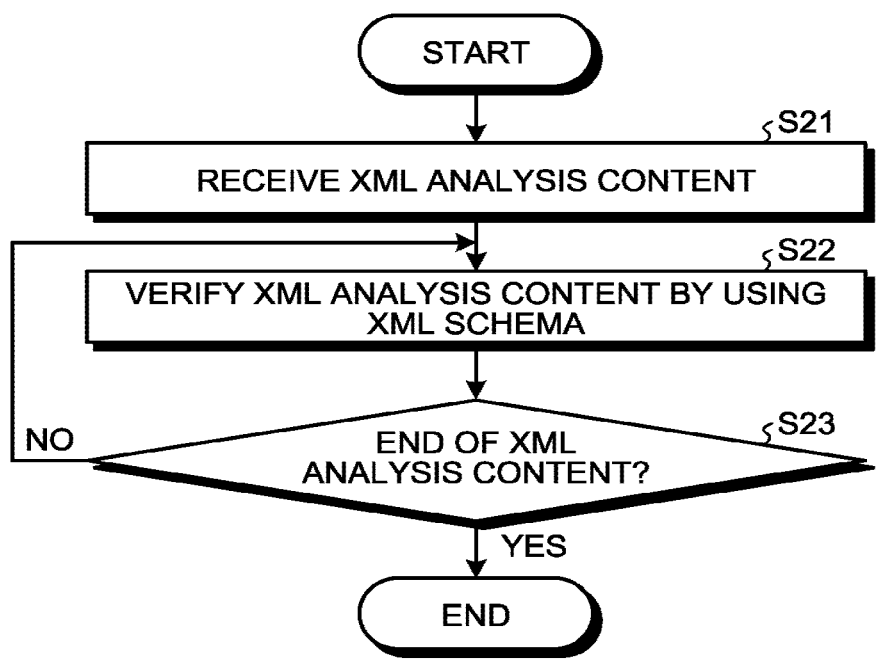
FIG. 10 is a diagram illustrating an example of a flowchart of schema verification processing according to the embodiment.

FIG. 10 is a diagram illustrating an example of a flowchart of schema verification processing according to the embodiment. As illustrated in FIG. 10, the schema verification unit 12 receives the XML analysis content (Step S21). The schema verification unit 12 verifies the XML analysis content by using an XML schema (Step S22).

Then, the schema verification unit 12 determines whether or not it is the end of the XML analysis content (Step S23). When the schema verification unit 12 determines that it is not the end of the XML analysis content (Step S23; No), the schema verification unit 12 proceeds to Step S22. On the other hand, when the schema verification unit 12 determines that it is the end of the XML analysis content (Step S23; Yes), the schema verification unit 12 ends the schema verification processing of the received XML analysis content.

Flowchart of Compression Processing

Figure 11:
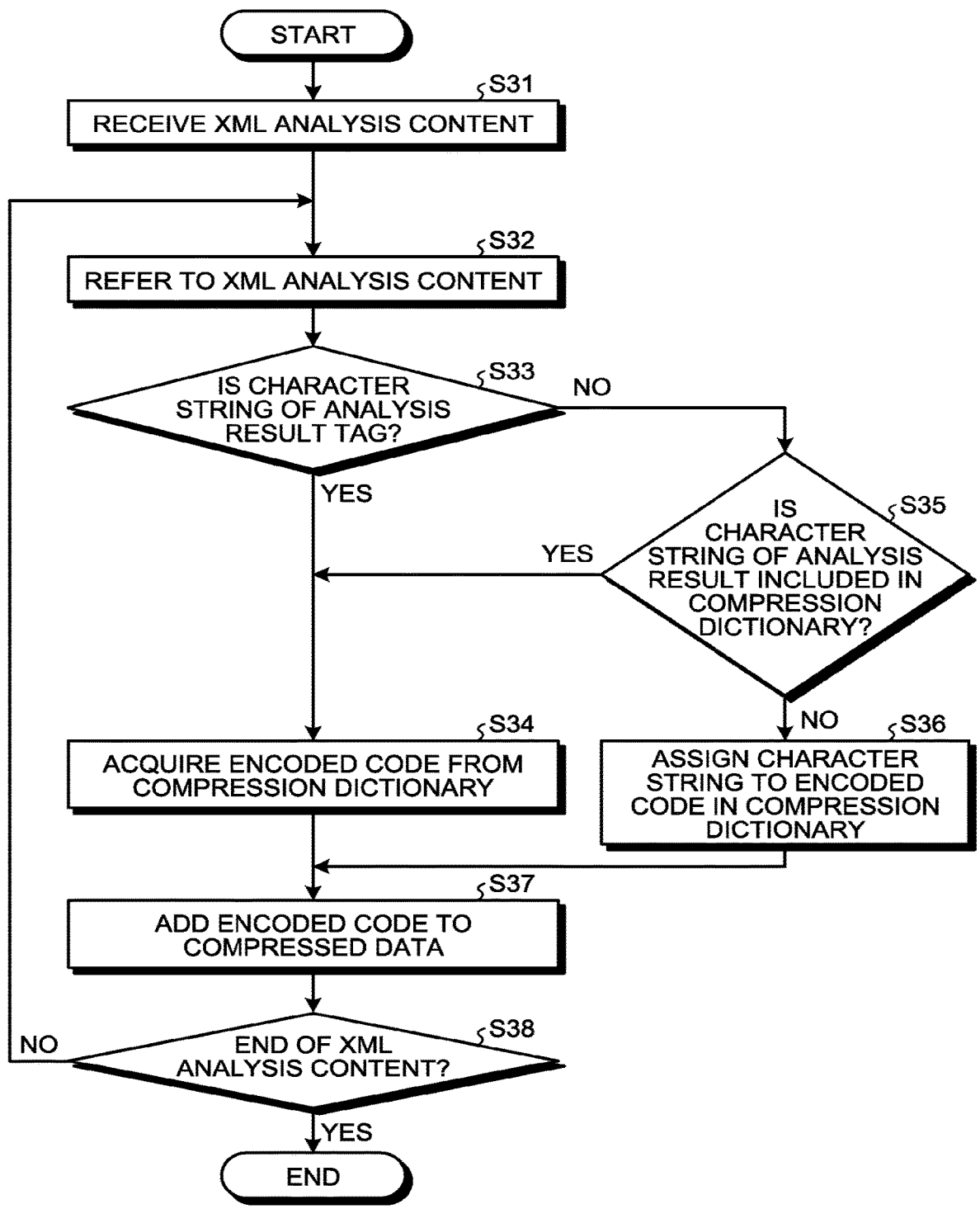
FIG. 11 is a diagram illustrating an example of a flowchart of compression processing according to the embodiment.

FIG. 11 is a diagram illustrating an example of a flowchart of compression processing according to the embodiment. As illustrated in FIG. 11, the compression unit 13 receives the XML analysis content (Step S31). The compression unit 13 refers to the XML analysis content (Step S32) and determines whether or not a character string of the analysis result is a tag (Step S33).

When the compression unit 13 determines that the character string of the analysis result is a tag (Step S33; Yes), the compression unit 13 acquires an encoded code corresponding to the character string from the compression dictionary 31 (Step S34). Then, the compression unit 13 proceeds to Step S37.

On the other hand, when the compression unit 13 determines that the character string of the analysis result is not a tag (Step S33; No), the compression unit 13 determines whether or not the character string is included in the compression dictionary 31 (Step S35). When the compression unit 13 determines that the character string is included in the compression dictionary 31 (Step S35, Yes), the compression unit 13 proceeds to Step S34 to encode the character string.

On the other hand, when the compression unit 13 determines that the character string is not included in the compression dictionary 31 (Step S35, No), the compression unit 13 assigns the character string to an encoded code in the compression dictionary 31 (Step S36). For example, the compression unit 13 assigns the character string of the analysis result to an encoded code in the compression dictionary 31 and registers the character string in the compression dictionary 31 in association with the assigned encoded code. Then, the compression unit 13 proceeds to Step S37.

In Step S37, the compression unit 13 adds the encoded code to the compressed data (Step S37).

Then, the compression unit 13 determines whether or not it is the end of the XML analysis content (Step S38). When the compression unit 13 determines that it is not the end of the XML analysis content (Step S38; No), the compression unit 13 proceeds to Step S32 to process the next character string of the analysis result. On the other hand, when the compression unit 13 determines that it is the end of the XML analysis content (Step S38; Yes), the compression unit 13 ends the compression processing of the received XML analysis content.

Flowchart of Check Function Table Initialization Processing

Figure 12:
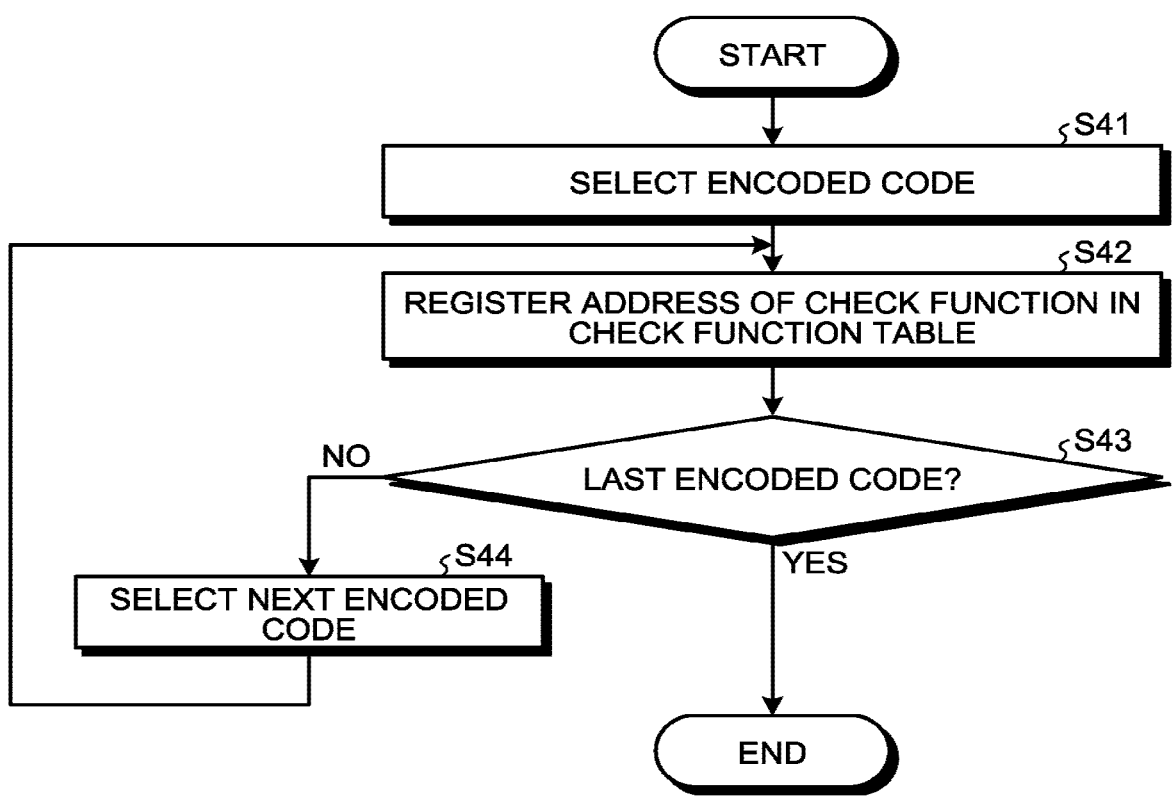
FIG. 12 is a diagram illustrating an example of a flowchart of check function table initialization processing according to the embodiment.

FIG. 12 is a diagram illustrating an example of a flowchart of check function table initialization processing according to the embodiment. As illustrated in FIG. 12, the check function table initialization unit 21 selects an encoded code from the compression dictionary 31 (Step S41).

Then, the check function table initialization unit 21 registers an address of a check function corresponding to the selected encoded code in the check function table 32 in association with the encoded code (Step S42). For example, when the selected encoded code corresponds to a high frequency keyword, the check function table initialization unit 21 registers an address of a check function corresponding to the encoded code in association with the same encoded code for one-byte code. When the selected encoded code corresponds to a low frequency keyword or a user-defined value, the check function table initialization unit 21 registers an address of a check function corresponding to the encoded code in association with the same encoded code for two-byte code. When the selected encoded code corresponds to a user-defined value, the check function table initialization unit 21 registers an address of a check function corresponding to the encoded code in association with the same encoded code for three-byte code.

Then, the check function table initialization unit 21 determines whether or not the encoded code is the last encoded code (Step S43). When the check function table initialization unit 21 determines that the encoded code is not the last encoded code (Step S43; No), the check function table initialization unit 21 selects the next encoded code from the compression dictionary 31 (Step S44). Then, the check function table initialization unit 21 proceeds to Step S42.

On the other hand, when the check function table initialization unit 21 determines that the encoded code is the last encoded code (Step S43; Yes), the check function table initialization unit 21 ends the check function table initialization processing.

Flowchart of Validity Verification Processing

Figure 13:
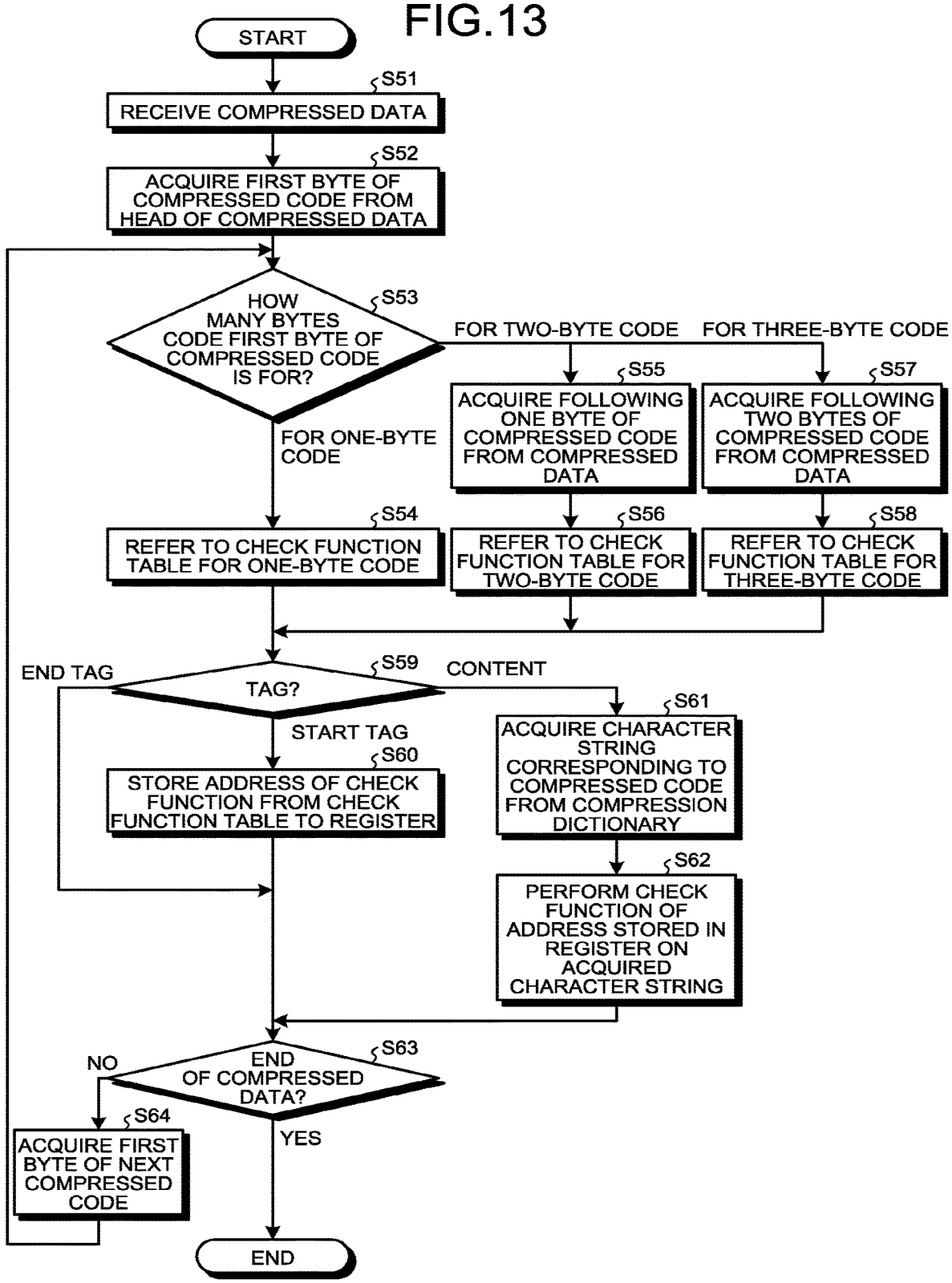
FIG. 13 is a diagram illustrating an example of a flowchart of the validity verification processing according to the embodiment.

FIG. 13 is a diagram illustrating an example of a flowchart of the validity verification processing according to the embodiment. In FIG. 13, the encoded code is described as a compressed code. As illustrated in FIG. 13, the validity verification unit 22 receives compressed data (Step S51). The validity verification unit 22 acquires a first byte of a compressed code from the head of the compressed data (Step S52).

The validity verification unit 22 determines how many bytes code the first byte of the compressed code is for (Step S53). For example, when the first byte of the compressed code is 00h to 7Fh, the validity verification unit 22 determines that the first byte is for one-byte code. When the first byte of the compressed code is 80h to 8Fh, the validity verification unit 22 determines that the first byte is for two-byte code. When the first byte of the compressed code is 90h to EFh, the validity verification unit 22 determines that the first byte is for two-byte code. When the first byte of the compressed code is F0h to FFh, the validity verification unit 22 determines that the first byte is for three-byte code.

When the validity verification unit 22 determines that the first byte of the compressed code is for one-byte code (Step S53; for one-byte code), the validity verification unit 22 refers to the check function table 32 for one-byte code (Step S54). Then, the validity verification unit 22 proceeds to Step S59.

When the validity verification unit 22 determines that the first byte of the compressed code is for two-byte code (Step S53; for two-byte code), the validity verification unit 22 acquires the following one byte of the compressed code from the compressed data (Step S55). Then, the validity verification unit 22 refers to the check function table 32 for two-byte code (Step S56). Then, the validity verification unit 22 proceeds to Step S59.

When the validity verification unit 22 determines that the first byte of the compressed code is for three-byte code (Step S53; for three-byte code), the validity verification unit 22 acquires the following two bytes of the compressed code from the compressed data (Step S57). Then, the validity verification unit 22 refers to the check function table 32 for three-byte code (Step S58). Then, the validity verification unit 22 proceeds to Step S59.

In Step S59, the validity verification unit 22 determines whether or not the compressed code is a code of a tag (Step S59). When the validity verification unit 22 determines that the compressed code is a code of a start tag (Step S59; start tag), the validity verification unit 22 stores an address of a check function corresponding to the compressed code from a corresponding check function table 32 to a register (Step S60). In other words, the validity verification unit 22 acquires an address of a check function corresponding to the compressed code from a corresponding check function table 32 and stores the acquired address of the check function to a register. Then, the validity verification unit 22 proceeds to Step S63.

When the validity verification unit 22 determines that the compressed code is a code of an end tag (Step S59; end tag), the validity verification unit 22 does nothing. Then, the validity verification unit 22 proceeds to Step S63.

When the validity verification unit 22 determines that the compressed code is a code of content (Step S59; content), the validity verification unit 22 acquires a character string corresponding to the compressed code from the compression dictionary 31 (Step S61). Then, the validity verification unit 22 performs the check function of the address stored in the register on the acquired character string (Step S62). Then, the validity verification unit 22 proceeds to Step S63.

In Step S63, the validity verification unit 22 determines whether or not it is the end of the compressed data (Step S63). When the validity verification unit 22 determines that it is not the end of the compressed data (Step S63; No), the validity verification unit 22 acquires a first byte of the next compressed code (Step S64). Then, the validity verification unit 22 proceeds to Step S53 to process the acquired next compressed code.

On the other hand, when the validity verification unit 22 determines that it is the end of the compressed data (Step S63; Yes), the validity verification unit 22 ends the validity verification processing of the received compressed data.

Effects of Embodiment

According to the embodiment described above, the information processing apparatus 1 receives encoded data that is encoded by the compression dictionary 31 in which a tag name and a definition value of each of a plurality of tags are associated with a code corresponding to the tag name and the definition value of each of the plurality of tags. When the information processing apparatus 1 decodes the encoded data, when decoding a code associated with a processing function from among codes registered in the compression dictionary 31, the information processing apparatus 1 performs verification processing of decoded data, which has been decoded, by using the processing function. According to the above configuration, the information processing apparatus 1 can collectively perform decoding of a tag, recognition of the tag, and verification processing of the tag.

Further, according to the embodiment described above, the information processing apparatus 1 sequentially selects codes in order from the head of the encoded data, and when the selected code is a code corresponding to a tag name of a start tag, the information processing apparatus 1 acquires a processing function associated with the selected code from the check function table 32. The information processing apparatus 1 performs verification processing of decoded data, which is obtained by decoding a code that is selected next by using the compression dictionary 31, by the acquired processing function. According to the above configuration, the information processing apparatus 1 can shorten time of validity verification of XML data when the XML data is encoded.

Further, according to the embodiment described above, the information processing apparatus 1 encodes data to be encoded, which includes a plurality of tags, by using the compression dictionary 31 in which a tag name and a definition value of each of a plurality of tags are associated with a code corresponding to the tag name and the definition value of each of the plurality of tags. The information processing apparatus 1 generates the check function table 32, in which a code and a processing function are associated with each other, for each set of codes included in the compression dictionary 31. According to the above configuration, the information processing apparatus 1 can collectively perform decoding of a tag, recognition of the tag, and verification processing of the tag when decoding encoded data by using the compression dictionary 31 and the check function table 32.

Others

In the embodiment, it is described that the lexical analysis unit 11 performs lexical analysis by using the start symbol '<' and the end symbol '>' as delimiting characters. However, the lexical analysis unit 11 is not limited to this, but may perform lexical analysis by also using the compression dictionary 31 as a dictionary for lexical analysis.

The components of the apparatuses illustrated in the drawings need not necessarily be physically configured as illustrated in the drawings. In other words, specific forms of distribution and integration of the apparatuses are not limited to those illustrated in the drawings, and all or part of the apparatuses can be functionally or physically distributed or integrated in arbitrary units according to various loads and the state of use. For example, the lexical analysis unit 11 and the schema verification unit 12 may be integrated together. The validity verification unit 22 may be divided into a first verification unit used when the encoded code is a one-byte code, a second verification unit used when the encoded code is a two-byte code, and a third verification unit used when the encoded code is a three-byte code. Further, the storage unit 30 may be an external apparatus of the information processing apparatus 1 and may be connected through a network.

Figure 14:
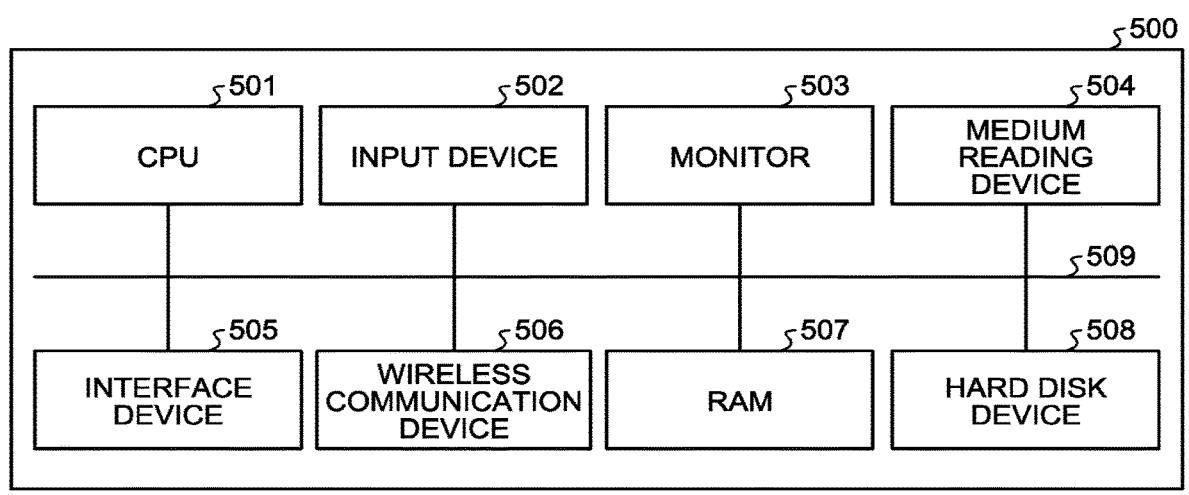
FIG. 14 is a diagram illustrating an example of a hardware configuration of the information processing apparatus.

FIG. 14 is a diagram illustrating an example of a hardware configuration of the information processing apparatus. As illustrated in FIG. 14, a computer 500 has a CPU 501 that performs various arithmetic processing, an input device 502 that receives data input from a user, and a monitor 503. Further, the computer 500 has a medium reading device 504 that reads a program and the like from a storage medium, an interface device 505 for connecting with other devices, and a wireless communication device 506 for wirelessly connecting with other devices. Further, the computer 500 has a RAM (Random Access Memory) 507 that temporarily stores various types of information and a hard disk device 508. The devices 501 to 508 are connected to a bus 509.

The hard disk device 508 stores a verification program having the same function as that of the verification unit 20 illustrated in FIG. 3. Further, the hard disk device 508 stores an encoding program having the same function as that of the compression unit 10. Further, the hard disk device 508 stores various data for realizing the verification program and the encoding program. The various data include data in the storage unit 30 illustrated in FIG. 3.

The CPU 501 reads each program stored in the hard disk device 508, arranges and executes the program on the RAM 507, and thereby performs various types of processing. The programs can cause the computer 500 to function as each functional unit illustrated in FIG. 4.

The verification program and the encoding program described above are not necessarily requested to be stored in the hard disk device 508. For example, the computer 500 may read and execute a program stored in a storage medium that can be read by the computer 500. The storage medium that can be read by the computer 500 is, for example, a portable recording medium such as a CD-ROM, a DVD-disk, and a USB (Universal Serial Bus) memory, a semi-conductor memory such as a flash memory, a hard disk drive, and the like. Further, these programs may be stored in these devices connected to a public network, the Internet, a LAN (Local Area Network), or the like, and the computer 500 may read the programs from the devices and execute the programs.

According to an embodiment of the present invention, it is possible to shorten verification time of an XML document when the XML document is compressed.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A verification method, comprising:
providing, by a processor, a table where an encoded code is associated with a validity check function that verifies validity of a decoded data by each byte length of encoded codes;
receiving, by the processor, encoded data that is encoded by an encoding dictionary in which a tag name and a definition value of each of a plurality of tags are associated with a code corresponding to the tag name and the definition value of each of the plurality of tags;
determining, by the processor, how many bytes the encoded data has and the validity check function corresponding to determined byte length by referring to the table; and
performing, by the processor, verification processing of h decoded data, which has been decoded, by using the determined validity check function, the determined validity check function verifying a validity of an XML document of the decoded data.

2. The verification method according to claim 1, wherein the validity check function is associated with each code of an automaton generated corresponding to the encoding dictionary.

3. The verification method according to claim 1, wherein the performing includes sequentially selecting codes in order from a head of the encoded data, and when a selected code is a code corresponding to a tag name of a start tag, acquiring a processing function associated with the selected code from an automaton and performing verification processing of decoded data, which is obtained by decoding a code that is selected next by using the encoding dictionary, by the acquired processing function, by the processor.

4. A verification apparatus, comprising:
a processor configured to:
provide a table where an encoded code is associated with a validity check function that verifies validity of a decoded data by each byte length of encoded codes;
receive encoded data that is encoded by an encoding dictionary in which a tag name and a definition value of each of a plurality of tags are associated with a code corresponding to the tag name and the definition value of each of the plurality of tags;
determine how many bytes the encoded data has and the validity check function corresponding to determined byte length by referring to the table; and
perform verification processing of decoded data, which has been decoded, by using the determined validity check function, the determined validity check function verifying a validity of an XML document of the decoded data.

5. An encoding method, comprising:
providing, by a processor, a table where an encoded code is associated with a validity check function that verifies validity of a decoded data by each byte length of encoded codes;
encoding, by the processor, data to be encoded, the data including a plurality of tags, by using an encoding dictionary in which a tag name and a definition value of each of the plurality of tags are associated with a code corresponding to the tag name and the definition value of each of the plurality of tags; and
generating, by the processor, an automaton, in which a code and a validity check function are associated with each other, for each set of codes included in the encoding dictionary by referring to the table, wherein
the validity check function verifies a validity of an XML document of the decoded data by sequentially selecting codes in order from a head of the encoded data, acquiring a validity check function associated with a byte length of a selected code from an automaton, and performing verification processing of decoded data, which is obtained by decoding a code that is selected next by using the encoding dictionary, by the validity check function, by the processor.

6. An encoding apparatus, comprising:
a processor configured to:
provide a table where an encoded code is associated with a validity check function that verifies validity of a decoded data by each byte length of encoded codes;
encode data to be encoded, the data including a plurality of tags, by using an encoding dictionary in which a tag name and a definition value of each of the plurality of tags are associated with a code corresponding to the tag name and the definition value of each of the plurality of tags; and
generate an automaton, in which a code and a validity check function are associated with each other, for each set of codes included in the encoding dictionary by referring to the table, wherein
the validity check function verifies a validity of an XML document of the decoded data by sequentially selecting codes in order from a head of the encoded data, acquiring a validity check function associated with a byte length of a selected code from an automaton, and performing verification processing of decoded data, which is obtained by decoding a code that is selected next by using the encoding dictionary, by the validity check function.

* * * * *